(12) United States Patent
Whitcore (10) Patent No.: US 11,755,282 B1
(45) Date of Patent: Sep. 12, 2023

(54) COLOR-CODED AUDIO ROUTING

(71) Applicant: AVID TECHNOLOGY, Inc., Burlington, MA (US)

(72) Inventor: John Whitcore, Worcester, MA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 18/045,501

(22) Filed: Oct. 11, 2022

(51) Int. Cl.
  *G06F 3/16* (2006.01)
  *G06F 3/0482* (2013.01)
  *G06F 3/04847* (2022.01)

(52) U.S. Cl.
  CPC ............ *G06F 3/165* (2013.01); *G06F 3/0482* (2013.01); *G06F 3/04847* (2013.01); *G06F 3/162* (2013.01)

(58) Field of Classification Search
  CPC .... G06F 3/0482; G06F 3/04847; G06F 3/165; G06F 3/162
  See application file for complete search history.

(56) References Cited

U.S. PATENT DOCUMENTS

| | | | | |
|---|---|---|---|---|
| 2009/0303389 A1* | 12/2009 | Nojima | ................... | H04N 5/265 348/706 |
| 2011/0075864 A1* | 3/2011 | Hagiwara | .............. | H04H 60/04 381/119 |
| 2011/0127930 A1* | 6/2011 | Bennette | ................ | H05B 45/20 315/312 |
| 2018/0353855 A1* | 12/2018 | Niemeyer | ........ | H04N 21/42203 |
| 2019/0122698 A1* | 4/2019 | Iyer | .......................... | G06F 16/61 |

FOREIGN PATENT DOCUMENTS

| | | | | |
|---|---|---|---|---|
| JP | WO2005081187 A1 | * | 8/2007 | |
| KR | 100885699 B1 | * | 2/2009 | |

OTHER PUBLICATIONS

Steinberg Forums, "Fader Cap colors?", published May 2012, available at https://forums.steinberg.net/t/fader-cap-colors/615251/print, retrieved May 3, 2023. (Year: 2012).*

"Color-coding tracks in the DAW", published Oct. 30, 2017, available at https://music.stoyanstefanov.com/2017/10/30/daw-track-colors, retrieved May 3, 2023. (Year: 2017).*

(Continued)

*Primary Examiner* — Shourjo Dasgupta
(74) *Attorney, Agent, or Firm* — Oliver Strimpel (57) ABSTRACT

A graphical user interface of control software hosted by an audio interface device enables an operator to match a particular monitor mix with the input signals that contribute to the mix. The audio interface device receives live and non-live inputs and generates a plurality of monitor mixes. Using the graphical user interface, the operator selects a monitor mix to which a distinguishing graphical feature is assigned. In response, a graphical representation of faders representing the live and non-live inputs to the selected monitor mix automatically redisplays the faders with the distinguishing graphical feature and at an attenuation level corresponding to each input's contribution to the selected output mix. The distinguishing feature may be a color or a shading. The user interface may be used in the context of a studio recording session as well as in live performance settings.

8 Claims, 4 Drawing Sheets

(56) References Cited

OTHER PUBLICATIONS

"Mixing Your Music: The Easy Guide to Sounding Like a Pro", published Oct. 27, 2015, available at https://www.landr.com/how-to-mix, retrieved May 3, 2023. (Year: 2015).*

Lee Cromartie, "Best Online DAWs for 2023", published Apr. 6, 2022, available at https://emastered.com/blog/best-online-daw, retrieved May 3, 2023. (Year: 2022).*

Oracle, "Dashboards", published on Feb. 22, 2022 to https://docs.oracle.com/cd/E75729_01/rpas/pdf/cloud/190/html/user_guide/output/dashboard.htm, retrieved May 3, 2023. (Year: 2022).*

* cited by examiner

COLOR-CODED AUDIO ROUTING

BACKGROUND

Audio compositions are created using digital audio composition applications, such as those referred to as digital audio workstations (DAWs). These tools enable audio editors to input multiple audio sources and to mix them together in flexible ways to produce the desired result. Audio compositions often involve more than 50 tracks and submixes, with movie soundtracks commonly including as many as 500 tracks. These are processed and combined using complex audio signal routing paths. DAWs are commonly operated in conjunction with an audio interface device, which receives as input signals the multiple output mixes from the DAW as well as audio signals received directly from audio capture devices such as microphones and electronic instruments. Existing audio interface devices provide a user interface designed to enable users to configure their desired signal routing on a track-by-track basis. However, the user interfaces do little to assist the operator to readily visualize how the various hardware and software inputs received by the audio interface device contribute to the output mixes generated in real-time by the audio interface device. This problem is especially acute when audio interface operators are adjusting the levels of a large number of non-live and live line inputs to create multiple output mixes. There is a need to provide a user interface for audio interface device operators that helps the operator to grasp the routing of the various audio device interface inputs to the outputs in real-time.

SUMMARY

In general, a color-coding scheme enables an operator to match a particular audio interface output mix with the input signals that contribute to the mix. The operator selects an output mix to inspect and perhaps to adjust, and a graphical representation of the input faders automatically changes color and fader levels to show the inputs and their levels corresponding to the selected output mix.

In general, in a first aspect, a method of generating a plurality of monitor mixes for monitoring live audio comprises: receiving at an audio interface device: a plurality of non-live audio inputs from a playback device; and a plurality of live audio inputs from a plurality of live audio sources; outputting the plurality of monitor mixes from the audio interface device; and executing on the audio interface device a control application, wherein the control application: displays an interactive user interface comprising: a plurality of output tiles, wherein each output tile of the plurality of output tiles corresponds to a given monitor mix of the plurality of monitor mixes and includes a distinguishing feature assigned to the given monitor mix; and a plurality of input tiles, wherein each input tile of the plurality of input tiles corresponds to a given audio input of the plurality of non-live and live audio inputs and includes an interactive graphical fader control of the given audio input; and when an operator of the audio interface device selects an output tile corresponding to a selected monitor mix of the plurality of monitor mixes: highlights the selected output tile; redisplays the plurality of input tiles such that for each input tile of the plurality of input tiles: the fader control of the input tile is displayed with the distinguishing feature assigned to the selected monitor mix; and the fader position of the input tile indicates a level currently assigned to the selected monitor mix of the audio input corresponding to the input tile.

Various embodiments include one or more of the following features. The distinguishing feature assigned to the given monitor mix is a color. The fader controls of the plurality of input tiles with the distinguishing feature assigned to the monitor mix corresponding to the selected output tile comprises displaying fader caps of the fader controls in the color assigned to the monitor mix. The method enables the operator of the audio interface device to adjust fader levels of the plurality of audio inputs. The playback device is a computer system hosting a digital audio workstation application.

In general, in another aspect, a computer program product comprises: a non-transitory computer-readable medium with computer-readable instructions encoded thereon, wherein the computer-readable instructions, when processed by a processing device instruct the processing device to perform a method of generating a plurality of monitor mixes for monitoring live audio, the method comprising: receiving at an audio interface device: a plurality of non-live audio inputs from a playback device; and a plurality of live audio inputs from a plurality of live audio sources; outputting the plurality of monitor mixes from the audio interface device; and executing on the audio interface device a control application, wherein the control application: displays an interactive user interface comprising: a plurality of output tiles, wherein each output tile of the plurality of output tiles corresponds to a given monitor mix of the plurality of monitor mixes and includes a distinguishing feature assigned to the given monitor mix; and a plurality of input tiles, wherein each input tile of the plurality of input tiles corresponds to a given audio input of the plurality of non-live and live audio inputs and includes an interactive graphical fader control of the given audio input; and when an operator of the audio interface device selects an output tile corresponding to a selected monitor mix of the plurality of monitor mixes: highlights the selected output tile; redisplays the plurality of input tiles such that for each input tile of the plurality of input tiles: the fader control of the input tile is displayed with the distinguishing feature assigned to the selected monitor mix; and the fader position of the input tile indicates a level currently assigned to the selected monitor mix of the audio input corresponding to the input tile.

In general, in a further aspect, a system comprises: a memory for storing computer-readable instructions; and a processor connected to the memory, wherein the processor, when executing the computer-readable instructions, causes the system to perform a method of generating a plurality of monitor mixes for monitoring live audio, the method comprising: receiving at an audio interface device: a plurality of non-live audio inputs from a playback device; and a plurality of live audio inputs from a plurality of live audio sources; outputting the plurality of monitor mixes from the audio interface device; and executing on the audio interface device a control application, wherein the control application: displays an interactive user interface comprising: a plurality of output tiles, wherein each output tile of the plurality of output tiles corresponds to a given monitor mix of the plurality of monitor mixes and includes a distinguishing feature assigned to the given monitor mix; and a plurality of input tiles, wherein each input tile of the plurality of input tiles corresponds to a given audio input of the plurality of non-live and live audio inputs and includes an interactive graphical fader control of the given audio input; and when an operator of the audio interface device selects an output tile corresponding to a selected monitor mix of the plurality of monitor mixes: highlights the selected output tile; redisplays the plurality of input tiles such that for each input tile of the plurality of input tiles: the fader control of the input tile is displayed with the distinguishing feature assigned to the selected monitor mix; and the fader position of the input tile indicates a level currently assigned to the selected monitor mix of the audio input corresponding to the input tile.

In general, in a still further aspect, an interactive software user interface for control of an audio interface device comprises: a display of a plurality of output tiles, wherein each output tile of the plurality of output tiles corresponds to a given monitor mix of a plurality of monitor mixes generated by the audio interface device and is displayed with a distinguishing feature assigned to the given monitor mix; and a display of a plurality of input tiles, wherein each input tile of the plurality of input tiles: corresponds to a given audio input of a plurality of live and non-live audio inputs to the audio interface device; and includes a graphical fader control for the given audio input; and wherein the user interface is configured to respond to an operator selection of an output tile corresponding to a selected monitor mix of the plurality of monitor mixes by: highlighting the selected output tile; redisplaying the plurality of input tiles such that for each input tile of the plurality of input tiles: the fader control of the input tile is displayed with the distinguishing feature assigned to the selected monitor mix; and a fader position of the input tile indicates a level currently assigned to the selected monitor mix of the audio input corresponding to the input tile.

DETAILED DESCRIPTION

Figure 1:
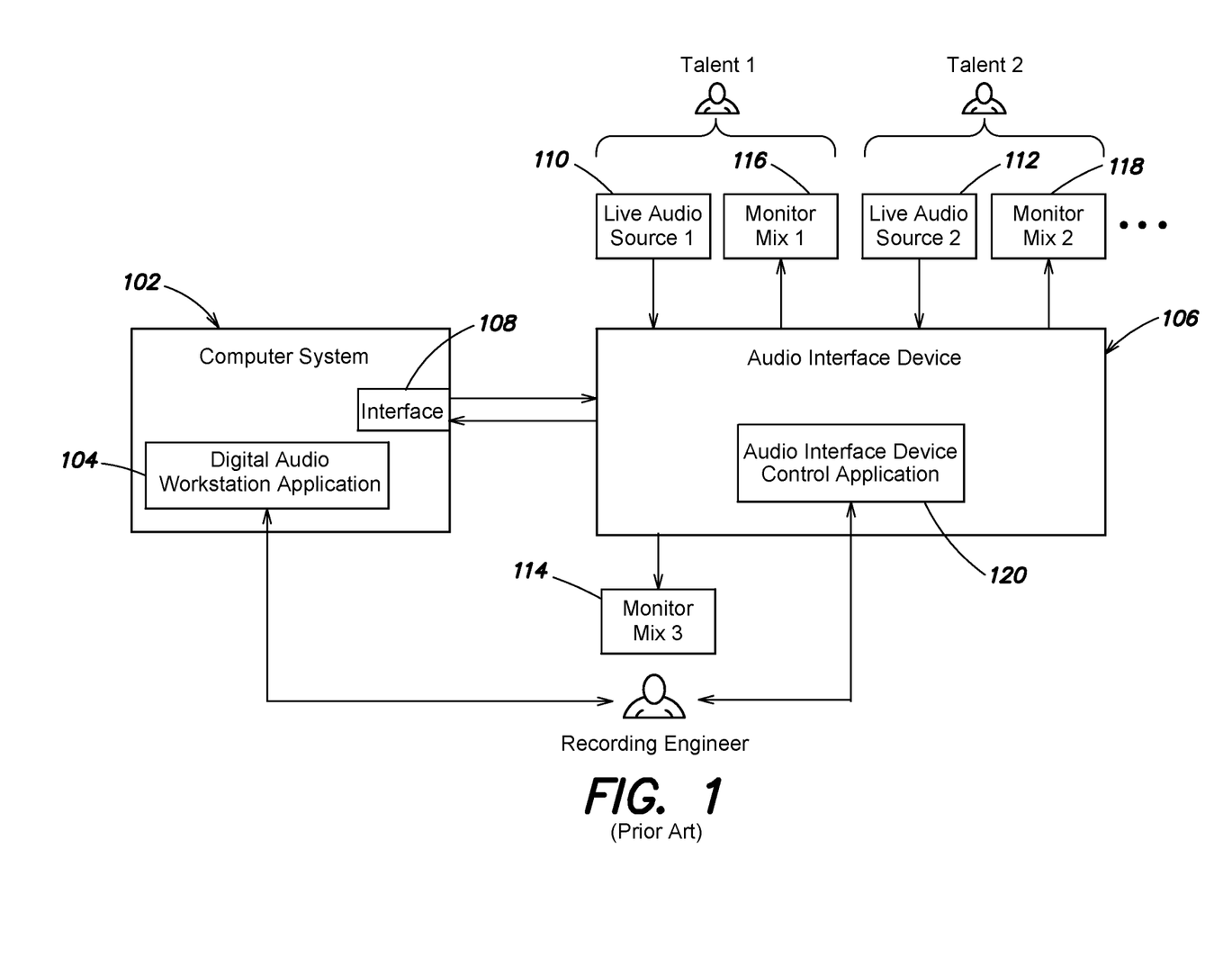
FIG. 1 is a high-level block diagram of a system for generating audio monitor mixes for live audio production and performance.

FIG. 1 is a high-level block diagram of a system for generating monitor mixes for music production and live audio settings. Computer system 102 hosts digital audio workstation application (DAW) 104, which is operated by a user who is often a recording engineer. In the Figure, the hosting system is shown as being local to the user, such as a user's personal computer or workstation or a networked system co-located with the user. Alternatively, applications may be hosted on remote servers or be implemented as cloud services. DAWs provide users with the ability to record audio, edit audio, route and mix audio, apply audio effects, automate audio effects and audio parameter settings, work with MIDI data, play instruments with MIDI data, and create audio tracks for video compositions. They enable editors to use multiple sources as inputs to a composition, which are combined in accordance with an editor's wishes to create the desired end product. An example of a DAW is Pro Tools®, a product of Avid® Technology, Inc. Aspects of DAW user interfaces are described in U.S. Pat. No. 10,770,045, which is wholly incorporated herein by reference. A DAW may be supplemented with audio interface device 106 connected to the DAW via computer interface 108, such as a USB, Ethernet, Thunderbolt, or serial PCIe interface. Such interface devices receive as inputs the various mixes output by DAW 104 via interface 108, as well audio signals received directly from various live audio sources 110, 112. The live sources may be performing artists, whose performance is captured by a microphone in the case of vocals or acoustic instruments, or directly via analog or digital output from electronic instruments such as electric guitar and synthesizers. The audio interface device mixes together the received inputs and outputs various mixes used for monitoring the performance.

Each monitor mix is customized for the needs of an intended recipient. For example, monitor mix 3 114 for the recording engineer typically includes all the audio inputs received by the audio interface device at approximately equal levels, whereas monitor mix 1 116 and monitor mix 2 118 for talent 1 and talent 2 respectively, may include only a particular cue mix from the DAW and selected live inputs received from instruments that each talent should hear in order to perform at the right tempo and with the needed harmonic accompaniment.

A challenge faced by the recording engineer is the need to adjust levels of a number of monitor mixes during a live performance. Adjustments may need to be made rapidly in response to the request from a performing talent or when acoustic conditions change in the performance venue. In a common scenario, the recording engineer switches rapidly between the multiple monitor mixes, sometimes up to 10 or 20 mixes, to check the levels and make any needed adjustments to the various inputs contributing to each of the monitor mixes. When doing this, the engineer needs a quick and intuitive way of knowing which monitor mix they are adjusting and what the existing input levels are for that mix.

To address this challenge, the audio interface device is controlled by audio interface device control application 120, which is hosted by the audio interface device. The recording engineer uses the control application to set the levels of the various inputs that contribute to each of the output mixes. The recording engineer uses an input device in data communication with audio interface device 106 to interact with the audio interface device control application. Commonly used input devices include a mouse and a touchscreen.

Figure 2:
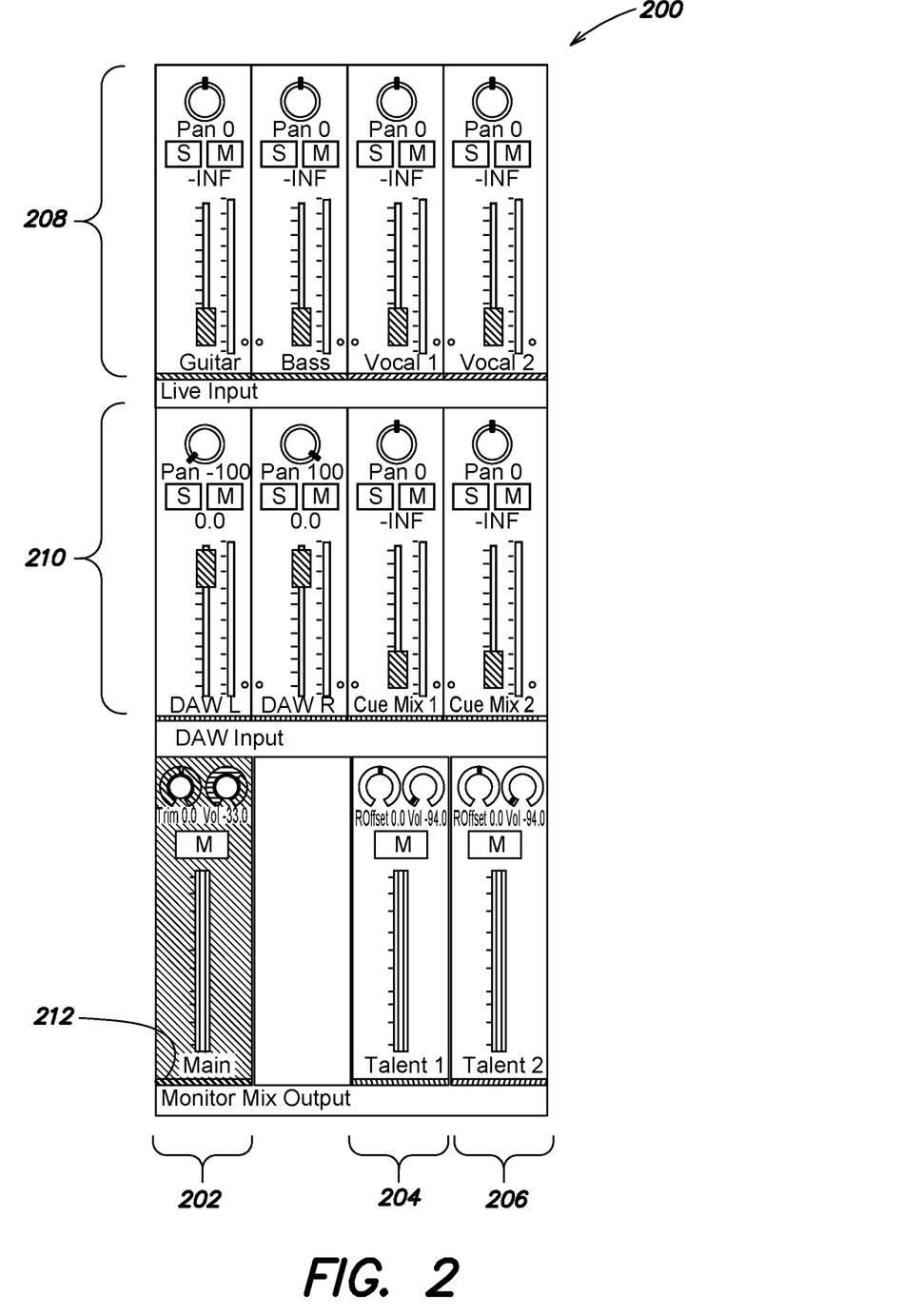
FIG. 2 is a diagrammatic screen shot of a portion of an interactive user interface of a control application for creating monitor mixes using an audio interface device when an operator has selected a main monitor mix.

FIG. 2 is a diagrammatic screen shot of a portion 200 of an interactive user interface of control application 120. The user interface includes a plurality of output tiles 202, 204, and 206. Each of the output tiles represents a corresponding monitor mix. There may be an arbitrary number of output tiles, one for each of the desired monitor mixes to be output from audio interface device 106. In the illustrated example, output tile 202 is the main output mix Main Mix, which represents the primary mix ultimately intended for the audience or listener. Output tiles 204 and 206 are for mixes directed to the headphones of two different talent artists: Talent 1 and Talent 2, respectively. User interface 200 also includes a plurality of input tiles. In the illustrated user interface, there are two rows of input tiles representing live inputs 208 and non-live inputs 210. In the use case illustrated in FIG. 2, the non-live inputs are received from a DAW. In other use cases the non-live inputs are received from playback devices, such as a standard digital or analog audio player. Each input tile represents a particular audio input to audio interface device 106. In the illustrated example, the live audio (hardware) inputs include guitar, bass, vocal 1, and vocal 2, and the non-live inputs are received from a DAW and include those named DAW L, DAW R, Cue Mix 1, and Cue Mix 2.

Each of the output tiles is displayed with a distinguishing feature. In the illustrated example, the distinguishing feature is a colored bar running across the bottom margin of each tile. In FIG. 2, the colored bar is represented by a black-and-white shading. For example, main output tile 202 has bar 212 which is shaded with the hatching representative of the color green. For Talent 1 output tile 204, the colored bar is shaded with a hatching representative of the color blue. The distinguishing feature of an output tile may include a shading or color of the entire tile, both when the tile is unselected by the recording engineer and when the tile is selected. In FIG. 2, output tile 202 for the main monitor mix has been selected, and the tile background is highlighted with the distinguishing feature of that tile, in this case a shade of the color green (indicated in the figure by the corresponding black-and-white hatching).

When the engineer wishes to view the input levels of a given monitor mix, they select the corresponding output tile, for example by clicking on it with a mouse. The output tile may become highlighted, as shown in FIG. 2, 202, and at the same time the faders on the input tiles are automatically moved to display the current input levels corresponding to the given monitor mix. Thus, for the example illustrated in FIG. 2, the input levels currently set for the selected mix output indicate 0.0 dB levels for the DAW L and DAW R inputs, with all the other inputs at negative infinity, i.e., zeroed out. Furthermore, the fader caps are automatically displayed with the distinguishing feature corresponding to the selected output mix. In the case illustrated in FIG. 2, the fader caps are shaded with the same color as bar 212, i.e., green (indicated in the figure by the corresponding black-and-white hatching). This provides a clear and intuitive indication to the engineer as to the output mix that is currently being viewed.

The distinguishing feature corresponding to the selected output tile may be reflected in the input tiles in other ways, with or without the colored shading of the fader caps. For example, the entire input tile may be shaded with a color in the same or similar hue to that of the output tile bar, but at a different saturation or brightness level.

If the engineer wishes to adjust levels of one or more of the inputs contributing to the selected output mix, they are able to interact with the displayed controls on user interface 200 of control application 120. For example, they may use a mouse to drag a fader cap up and down to raise or lower the input level controlled by that fader.

Figure 3:
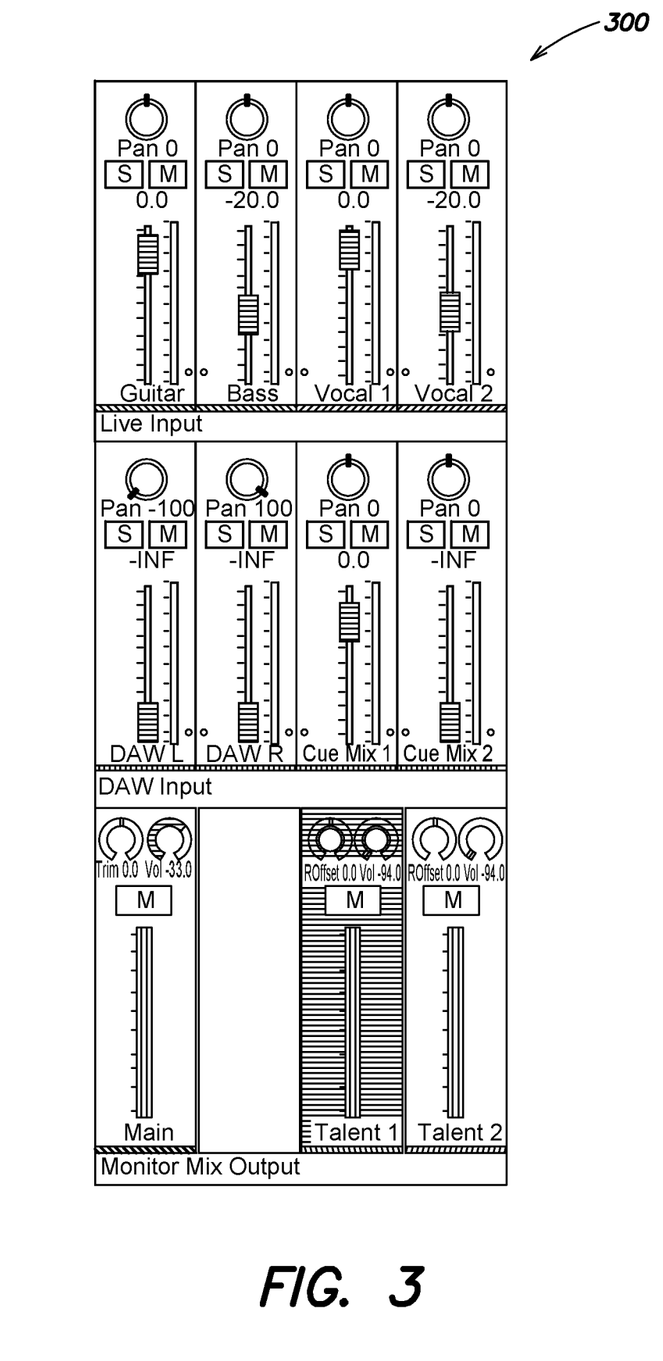
FIG. 3 is a diagrammatic screen shot of the same portion of the interactive user interface of FIG. 2 when the operator has selected a talent monitor mix.

FIG. 3 is a diagrammatic screen shot of the same portion of the user interface of control application 120 shown in FIG. 2 but showing displayed portion 300 when the recording engineer selects output monitor mix 204 for Talent 1. In this case, the distinguishing bar at the bottom of the corresponding output tile is blue (indicated in the figure with the corresponding black-and-white hatching), and when selected, the background of the entire output tile appears in a shade of blue. At the same time, the fader positions are redisplayed to indicate the levels of the inputs for the Talent 1 monitor mix. As the figure shows, the mix includes unattenuated inputs from the DAW output labeled Cue Mix 1, and live audio inputs "Guitar" and Vocal 1" and −20 dB levels for "Bass" and "Vocal 2." The fader caps are redisplayed with the distinguishing feature of the selected monitor mix, i.e., Talent 1.

As mentioned above, the number of output tiles may increase to up to 20 or more depending on the number of distinct output mixes that are needed. The audio interface control application may include the output tiles in a single row as illustrated in FIGS. 2 and 3, though it may be necessary for the engineer to scroll left and right to see certain tiles. A similar situation applies to the input tiles as the number of live inputs increases, for example when recording a performance with a large orchestra with each instrument generating an audio signal that is sent to the audio interface device.

Figure 4:
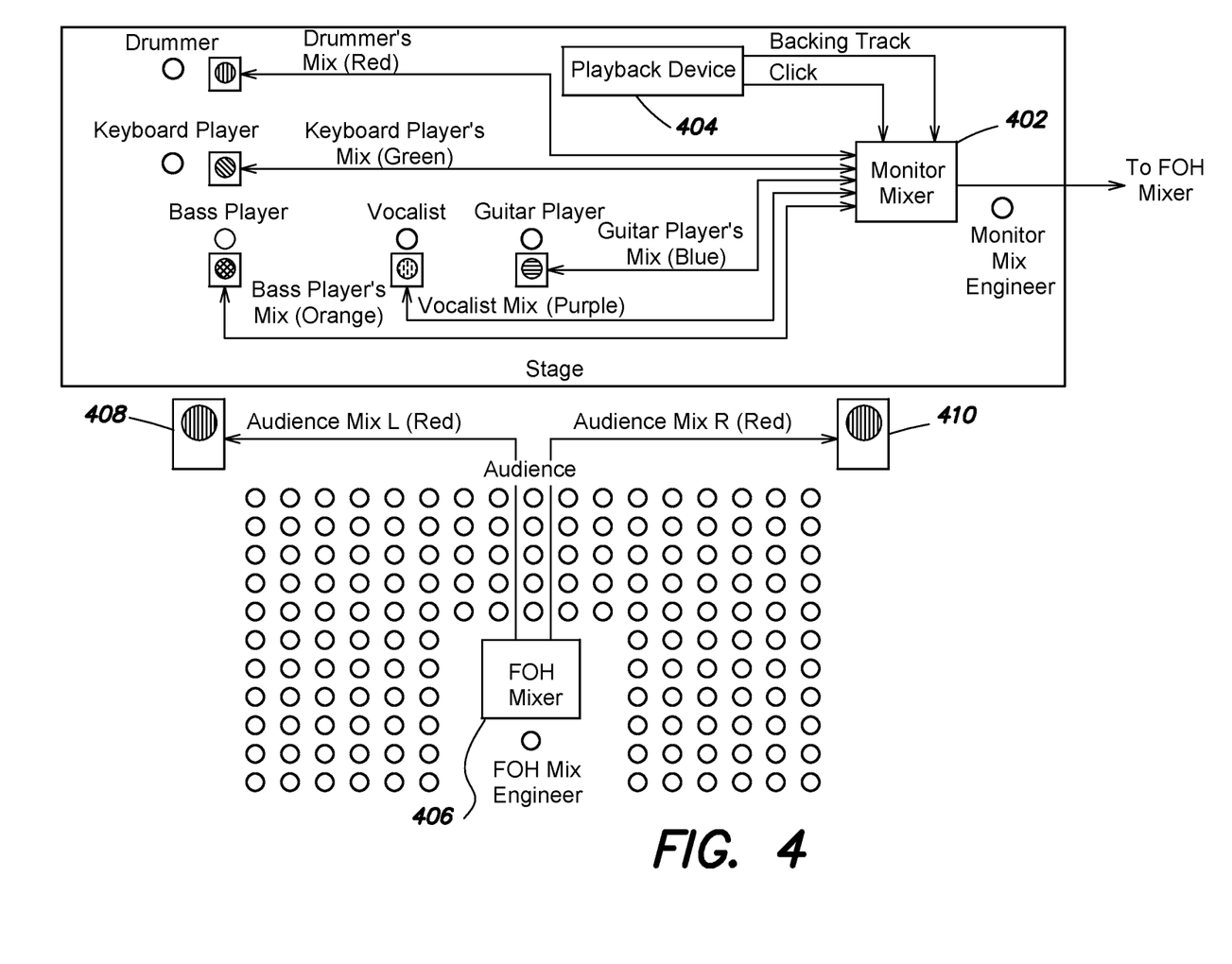
FIG. 4 is a high-level block diagram of a live performance use case in which a monitor mix engineer generates monitor mixes for live performers using the described user interface.

The methods described herein may be applied in the context of a live performance in which two or more engineers work in tandem to generate the desired mixes. In one common scenario, illustrated in FIG. 4, a monitor mix engineer is located on the stage in relative proximity to the performers and a front of house (FOH) mix engineer is embedded within the audience. The monitor mix engineer uses monitor mixer 402 via its control application (not shown) to generate monitor mixes for each performer, such as the bass player, vocalist, guitar player, keyboard player, and drummer as shown in the figure. Inputs to monitor mixer 402 include live inputs from each of the performers as well as non-live inputs, such as a backing track and a click track from playback device 404. In some scenarios, the playback device may be a computer system hosting a DAW. The control application for monitor mixer 402 includes an interactive user interface with the features described above in connection with a recording environment. Thus, the output tiles of the monitor mixer control application will include tiles representing monitor mixes for each of the performers with their corresponding distinguishing features, e.g., orange for the bass player, purple for the vocalist, etc., as indicated in FIG. 4. When the monitor mix engineer selects an output tile corresponding to a monitor mix they wish to view and/or adjust, the input tiles representing the live and non-live (i.e., playback device) inputs are redisplayed with the distinguishing feature of the selected output tile, and jump to the input levels currently set for that mix. For the color-based distinguishing features indicated in FIG. 4, when the bass player's mix is selected, the input tiles jump to the levels set for the bass monitor mix and the fader caps are colored orange. Similarly, the colors purple, blue, green, and red are used for the vocalist mix, guitar-player's mix, keyboard-player's mix, and drummer's mix respectively. The choice of distinguishing feature/color is arbitrary. The choices may be designed to help distinguish one mix from another clearly so as to make it clear to the engineer which mix is being viewed or adjusted.

The front of house engineer uses FOH mixer 406 to create mixes for the live audience, including left and right channel mixes directed to left and right loudspeakers 408 and 410 respectively. The inputs to FOH mixer 406 include all of the inputs received by on-stage monitor mixer 402. However, in contrast to the monitor mix engineer, the FOH mix engineer generally creates only two output mixes, audience mix L 408 for the speakers on the left side of the venue and audience mix R 410 for the speakers on the right side of the venue.

In various use case scenarios, the recording talent may wish to have control over their own cue/monitor mix. In this case, the talent may be given control over their own mix via control application 120 by using an application running locally on a personal device, such as a smartphone. The talent's device is in data communication with audio interface device 106, typically via a wireless connection such as Wi-Fi or Bluetooth. The user interface of the recording/mix engineers reflects the current levels of the talent's mix when that mix is selected by the engineer.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of generating a plurality of monitor mixes for monitoring live audio, the method comprising:
    receiving at an audio interface device:
        a plurality of non-live audio inputs from a playback device; and
        a plurality of live audio inputs from a plurality of live audio sources;
    outputting the plurality of monitor mixes from the audio interface device; and
    executing on the audio interface device a control application, wherein the control application:
        displays an interactive user interface comprising:
            a plurality of output tiles, wherein each output tile of the plurality of output tiles corresponds to a given monitor mix of the plurality of monitor mixes and includes a distinguishing feature assigned to the given monitor mix, and wherein the distinguishing feature remains unchanged when an operator of the audio interface device adjusts a level of at least one of the plurality of non-live inputs and plurality of live audio inputs; and
            a plurality of input tiles, wherein each input tile of the plurality of input tiles corresponds to a given audio input of the plurality of non-live and live audio inputs and includes an interactive graphical fader control of the given audio input; and
        when an operator of the audio interface device selects an output tile corresponding to a selected monitor mix of the plurality of monitor mixes:
            highlights the selected output tile;
            redisplays the plurality of input tiles such that for each input tile of the plurality of input tiles:
                the fader control of the input tile is displayed with the distinguishing feature assigned to the selected monitor mix; and
                the fader position of the input tile indicates a level currently assigned to the selected monitor mix of the audio input corresponding to the input tile.

2. The method of claim 1, wherein the distinguishing feature assigned to the given monitor mix is a color.

3. The method of claim 2, wherein displaying the fader controls of the plurality of input tiles with the distinguishing feature assigned to the monitor mix corresponding to the selected output tile comprises displaying fader caps of the fader controls in the color assigned to the monitor mix.

4. The method of claim 1, further comprising enabling the operator of the audio interface device to adjust fader levels of the plurality of audio inputs.

5. The method of claim 1, wherein the playback device is a computer system hosting a digital audio workstation application.

6. A computer program product comprising:
a non-transitory computer-readable medium with computer-readable instructions encoded thereon, wherein the computer-readable instructions, when processed by a processing device instruct the processing device to perform a method of generating a plurality of monitor mixes for monitoring live audio, the method comprising:
  receiving at an audio interface device:
    a plurality of non-live audio inputs from a playback device; and
    a plurality of live audio inputs from a plurality of live audio sources;
  outputting the plurality of monitor mixes from the audio interface device; and
  executing on the audio interface device a control application, wherein the control application:
    displays an interactive user interface comprising:
      a plurality of output tiles, wherein each output tile of the plurality of output tiles corresponds to a given monitor mix of the plurality of monitor mixes and includes a distinguishing feature assigned to the given monitor mix, and wherein the distinguishing feature remains unchanged when an operator of the audio interface device adjusts a level of at least one of the plurality of non-live inputs and plurality of live audio inputs; and
      a plurality of input tiles, wherein each input tile of the plurality of input tiles corresponds to a given audio input of the plurality of non-live and live audio inputs and includes an interactive graphical fader control of the given audio input; and
    when an operator of the audio interface device selects an output tile corresponding to a selected monitor mix of the plurality of monitor mixes:
      highlights the selected output tile;
      redisplays the plurality of input tiles such that for each input tile of the plurality of input tiles:
        the fader control of the input tile is displayed with the distinguishing feature assigned to the selected monitor mix; and
        the fader position of the input tile indicates a level currently assigned to the selected monitor mix of the audio input corresponding to the input tile.

7. A system comprising:
a memory for storing computer-readable instructions; and
a processor connected to the memory, wherein the processor, when executing the computer-readable instructions, causes the system to perform a method of generating a plurality of monitor mixes for monitoring live audio, the method comprising:
  receiving at an audio interface device:
    a plurality of non-live audio inputs from a playback device; and
    a plurality of live audio inputs from a plurality of live audio sources;
  outputting the plurality of monitor mixes from the audio interface device; and
  executing on the audio interface device a control application, wherein the control application:
    displays an interactive user interface comprising:
      a plurality of output tiles, wherein each output tile of the plurality of output tiles corresponds to a given monitor mix of the plurality of monitor mixes and includes a distinguishing feature assigned to the given monitor mix, and wherein the distinguishing feature remains unchanged when an operator of the audio interface device adjusts a level of at least one of the plurality of non-live inputs and plurality of live audio inputs; and
      a plurality of input tiles, wherein each input tile of the plurality of input tiles corresponds to a given audio input of the plurality of non-live and live audio inputs and includes an interactive graphical fader control of the given audio input; and
    when an operator of the audio interface device selects an output tile corresponding to a selected monitor mix of the plurality of monitor mixes:
      highlights the selected output tile;
      redisplays the plurality of input tiles such that for each input tile of the plurality of input tiles:
        the fader control of the input tile is displayed with the distinguishing feature assigned to the selected monitor mix; and
        the fader position of the input tile indicates a level currently assigned to the selected monitor mix of the audio input corresponding to the input tile.

8. A computer program product comprising:
a non-transitory computer-readable medium with computer-readable instructions encoded thereon, wherein the computer-readable instructions, when processed by an audio interface device instruct the audio interface device to perform a method of generating a plurality of audio mixes by mixing a plurality of audio inputs, the method comprising:
  displaying on a monitor in data communication with the audio interface device:
    a plurality of output tiles, wherein each output tile of the plurality of output tiles corresponds to a given audio mix of a plurality of audio mixes generated by the audio interface device and is displayed with a distinguishing feature assigned to the given audio mix, and wherein the distinguishing feature remains unchanged when an operator of the audio interface device adjusts a level of at least one of the plurality of audio inputs; and
    a plurality of input tiles, wherein each input tile of the plurality of input tiles corresponds to a given audio input of the plurality of audio inputs and includes an interactive graphical fader control of the given audio input; and
  when an operator of the processing device selects an output tile corresponding to a selected monitor mix of the plurality of monitor mixes:
    highlighting the selected output tile;
    redisplaying the plurality of input tiles such that for each input tile of the plurality of input tiles:
      the fader control of the input tile is displayed with the distinguishing feature assigned to the selected monitor mix; and the fader position of the input tile indicates a level currently assigned to the selected monitor mix of the audio input corresponding to the input tile.

\* \* \* \* \*